US012803164B2

(12) United States Patent
Ma et al.

(10) Patent No.: US 12,803,164 B2
(45) Date of Patent: Nov. 17, 2026

(54) LIQUID-CRYSTAL PHASE SHIFTER AND ANTENNA DEVICE

(71) Applicant: BOE Technology Group Co., Ltd., Beijing (CN)

(72) Inventors: Yong Ma, Beijing (CN); Hua Huang, Beijing (CN); Xin Gu, Beijing (CN); Zhao Kang, Beijing (CN); Shulei Li, Beijing (CN); Changhan Hsieh, Beijing (CN); Chengtan Zhao, Beijing (CN); Zhao Cui, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 576 days.

(21) Appl. No.: 18/274,743

(22) PCT Filed: Jul. 27, 2022

(86) PCT No.: PCT/CN2022/108299
§ 371 (c)(1),
(2) Date: Jul. 28, 2023

(87) PCT Pub. No.: WO2024/020871
PCT Pub. Date: Feb. 1, 2024

(65) Prior Publication Data
US 2025/0023234 A1 Jan. 16, 2025

(51) Int. Cl.
*H01Q 3/36* (2006.01)

(52) U.S. Cl.
CPC .................................... *H01Q 3/36* (2013.01)

(58) Field of Classification Search
CPC .. G02F 1/1339; G02F 1/13394; G02F 1/1343; G02F 1/134309; G02F 1/1345; G02F 1/13452; H01Q 3/36
(Continued)

(56) References Cited

U.S. PATENT DOCUMENTS 6,862,069 B2 3/2005 Kwak et al.
2001/0022639 A1* 9/2001 Kwak .................. G02F 1/1345 349/122
(Continued)

FOREIGN PATENT DOCUMENTS

CN 1318182 A 10/2001
CN 101315497 A 12/2008
(Continued)

OTHER PUBLICATIONS

Office Action dated Mar. 11, 2025, issued in counterpart CN Application No. 202280002433.3, with English translation. (19 pages).

*Primary Examiner* — David Y Chung
(74) *Attorney, Agent, or Firm* — WHDA, LLP

(57) ABSTRACT

A frame sealing adhesive of the liquid-crystal phase shifter is disposed between two transparent substrates, the frame sealing adhesive encloses a first cavity, a first part of the metal-trace layer is located inside the first cavity, and a second part of the metal-trace layer is located outside the first cavity. The second part is disposed on first surfaces or second surfaces of the two transparent substrates. If the second part is disposed on the first surfaces of the two transparent substrates, metal cushion layers are provided between the frame sealing adhesive and the first surfaces of the two transparent substrates. If the second part is disposed on the second surfaces of the two transparent substrates, the first part and the second part are electrically connected by metal via holes provided in the transparent substrates, and the frame sealing adhesive contacts the first surfaces of the two transparent substrates.

20 Claims, 6 Drawing Sheets

(58) Field of Classification Search
USPC .......................................................... 349/153
See application file for complete search history.

(56) References Cited

U.S. PATENT DOCUMENTS

| | | | | |
|---|---|---|---|---|
| 2013/0335691 A1* | 12/2013 | Wu | G02F 1/13392 445/24 |
| 2015/0253602 A1 | 9/2015 | Kim et al. | |
| 2019/0103671 A1* | 4/2019 | Dong | H01Q 1/364 |
| 2022/0021094 A1 | 1/2022 | Wu et al. | |

FOREIGN PATENT DOCUMENTS

| | | | |
|---|---|---|---|
| CN | 107706502 | A | 2/2018 |
| CN | 108363231 | A | 8/2018 |
| CN | 112731715 | A | 4/2021 |
| JP | 2009-180775 | A | 8/2009 |

* cited by examiner

LIQUID-CRYSTAL PHASE SHIFTER AND ANTENNA DEVICE

TECHNICAL FIELD

The present disclosure relates to the technical field of signal transmission, and particularly relates to a liquid-crystal phase shifter and an antenna device.

BACKGROUND

With the development of mobile electronic devices, there are increasingly higher requirements on the antenna devices for the signal transmission. In order to adapt for the usage of the electronic devices, usually an antenna device having a liquid-crystal phase shifter as the phase-shifting unit is provided at the electronic devices, to serve to reduce the weight of the antenna device and improve the signal stability.

Currently, the antenna devices having a liquid-crystal phase shifter as the phase-shifting unit usually comprise two separately arranged transparent substrates and a metal-trace layer provided on the surfaces of the transparent substrates. Inside the liquid-crystal cell, it is required to spread-coating a frame sealing adhesive according to the pattern of the panel.

Subsequently, when the frame sealing adhesive is being spread-coated, part of the frame sealing adhesive is required to be spread-coated onto the metal-trace layer. Therefore, the spacing between the two transparent substrates at the position of the frame sealing adhesive spread-coated on the metal-trace layer is greater than the spacing between the two transparent substrates corresponding to the other part of the frame sealing adhesive, which causes that the spacing between the two transparent substrates is not constant, and cannot maintain the liquid-crystal-layer spacing to be constant, thereby affecting the stability of the phase-shifting amount of the liquid-crystal phase shifter.

SUMMARY

The embodiments of the present disclosure provide a liquid-crystal phase shifter and an antenna device, to solve the problem in the related art that the liquid-crystal-layer spacing cannot be maintained constant.

In order to solve the above technical problem, the present disclosure is realized as follows:

In the first aspect, an embodiment of the present disclosure provides a liquid-crystal phase shifter, wherein the liquid-crystal phase shifter comprises a metal-trace layer, a frame sealing adhesive, and two separately arranged transparent substrates;

- the frame sealing adhesive is disposed between the two transparent substrates, the frame sealing adhesive encloses a first cavity, a first part of the metal-trace layer is located inside the first cavity, and a second part of the metal-trace layer is located outside the first cavity;
- the second part is disposed on first surfaces or second surfaces of the two transparent substrates, wherein the first surfaces refer to surfaces that face each other of the two transparent substrates, and the second surfaces refer to surfaces of the transparent substrates that are opposite to the first surfaces;
- if the second part is disposed on the first surfaces of the two transparent substrates, metal cushion layers are provided between the frame sealing adhesive and the first surfaces of the two transparent substrates, whereby a spacing between the two transparent substrates tends to be constant; and
- if the second part is disposed on the second surfaces of the two transparent substrates, the first part and the second part are electrically connected by metal via holes provided in the transparent substrates, and the frame sealing adhesive contacts the first surfaces of the two transparent substrates.

Optionally, the metal-trace layer comprises at least two metal-trace strips arranged parallelly; and if the second part is disposed on the first surfaces of the two transparent substrates, each of the metal cushion layers provided on two sides of the metal-trace strips comprises a plurality of metal cushion blocks separately arranged.

Optionally, the frame sealing adhesive comprises a plurality of silicon balls; and

- one instance of the silicon balls is lap-joined to two neighboring instances of the metal cushion blocks, and a spacing d between the two neighboring instances of the metal cushion blocks is equal to $4m(2r-m)^{1/2}$, wherein r is a radius of the silicon ball, and m is a distance between a midpoint of a connecting line between contact points of the silicon ball with the two neighboring instances of the metal cushion blocks and a bottom of the silicon ball.

Optionally, the spacing d between the two neighboring instances of the metal cushion blocks is greater than or equal to 0.5 micrometers, and less than or equal to 1.5 micrometers.

Optionally, a dimension L of each of the metal cushion blocks in a second direction is equal to 2r−d, wherein r is a radius of the silicon ball, and d is a spacing between two neighboring instances of the metal cushion blocks;

- a dimension W of each of the metal cushion blocks in a first direction is greater than or equal to 1 millimeter, and less than or equal to 1.2 millimeters; and
- a dimension L of each of the metal cushion blocks in the second direction is greater than or equal to 23.5 micrometers, and less than or equal to 26 micrometers, wherein the first direction refers to a direction perpendicular to planes where the transparent substrates are located, and the second direction refers to a direction perpendicular to the first direction.

Optionally, distances from one instance of the metal cushion blocks that is disposed between the two metal-trace strips arranged parallelly to the metal-trace strips are greater than or equal to 0.9 micrometers, and less than or equal to 1.1 micrometers.

Optionally, supporting assemblies are provided between the transparent substrates located inside the first cavity, and one instance of the supporting assemblies that is disposed on one of the two transparent substrates is cooperatively connected to one instance of the supporting assemblies that is disposed on the other of the transparent substrates.

Optionally, the supporting assemblies comprise at least two snap-fitting members and at least two biting members;

- one instance of the snap-fitting members that is disposed on one of the two transparent substrates is snap-fitted to one instance of the biting members that is disposed on the other of the transparent substrates; and
- one instance of the biting members that is disposed on one of the two transparent substrates is snap-fitted to one instance of the snap-fitting members that is disposed on the other of the transparent substrates.

Optionally, the quantity of the snap-fitting members and the quantity of the biting members that are provided on the same one transparent substrate are equal.

Optionally, a cross section of each of the snap-fitting members in a second direction is trapezoidal, and a cross section of each of the biting members in the second direction has a trapezoidal slot, wherein the second direction refers to a direction perpendicular to planes where the transparent substrates are located.

Optionally, the cross section of each of the snap-fitting members in the second direction is an isosceles-trapezoidal cross section;

the cross section of each of the biting members in the second direction has an isosceles-trapezoidal slot; and a dimension of the isosceles-trapezoidal cross section in a first direction is two thirds of a distance between the two transparent substrates.

In the second aspect, an embodiment of the present disclosure further provides an antenna device, wherein the antenna device comprises the liquid-crystal phase shifter according to any one of the embodiments in the first aspect.

It can be seen from the above embodiments that, in the embodiments of the present disclosure, because, if the second part of the metal-trace layer is disposed on the first surfaces of the two transparent substrates, metal cushion layers are provided between the frame sealing adhesive and the first surfaces of the two transparent substrates, the frame-sealing-adhesive layer cannot only be supported by the metal-trace layer, but also be supported by the metal cushion layers, whereby the spacing between the two transparent substrates tends to be constant, thereby enabling the frame sealing adhesive to be maintained in the same one horizontal plane. Furthermore, if the second part is disposed on the second surfaces of the two transparent substrates, the first part and the second part are electrically connected by metal via holes provided in the transparent substrates, and the frame sealing adhesive contacts the first surfaces of the two transparent substrates, whereby the frame sealing adhesive located at the boundary between the first part and the second part of the metal-trace layer directly contacts the first surfaces of the two transparent substrates, or, in other words, the frame-sealing-adhesive layer does not adhere to the surface of the metal-trace layer, thereby enabling the frame sealing adhesive to be maintained in the same one horizontal plane. In conclusion, in the liquid-crystal phase shifter according to the embodiments of the present disclosure, because it can be ensured that the frame sealing adhesive is spread-coated to the same one horizontal plane, difference in the spacing between the two transparent substrates caused by the provision of the metal-trace layer can be prevented, which facilitates to ensure the evenness of the liquid-crystal-layer spacing, to ensure the stability of the phase-shifting amount of the liquid-crystal phase shifter.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are embodiments of the present disclosure, and a person skilled in the art can obtain other figures according to these figures without paying creative work.

REFERENCE NUMBERS

1: metal-trace layer; 2: frame sealing adhesive; 3: transparent substrates; 4: metal cushion layers; 5: supporting assemblies; 6: seed layer; 7: photoresist blocking walls; 11: first part; 12: second part; 13: metal-trace strips; 21: silicon balls; 41: metal cushion blocks; 51: snap-fitting members; and 52: biting members.

DETAILED DESCRIPTION

The technical solutions according to the embodiments of the present disclosure will be clearly and completely described below with reference to the drawings according to the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be understood that the “one embodiment” or “an embodiment” as used throughout the description means that particular features, structures or characteristics with respect to the embodiments are included in at least one embodiment of the present disclosure. Therefore, the "in one embodiment" or "in an embodiment" as used throughout the description does not necessarily refer to the same embodiment. Furthermore, those particular features, structures or characteristics may be combined in one or more embodiments in any suitable form.

Figure 1:
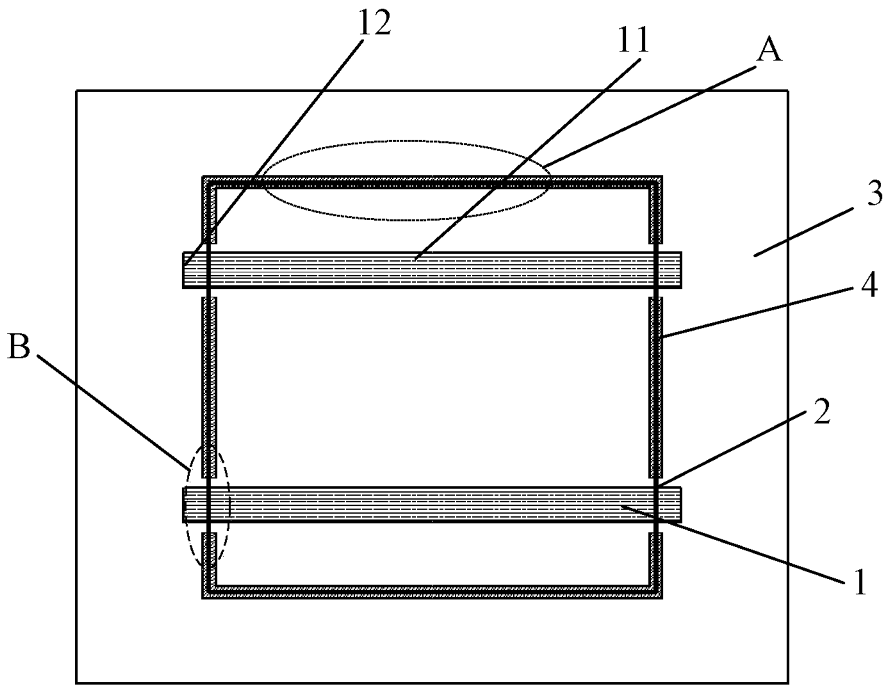
FIG. 1 shows a schematic structural diagram of a first type of the liquid-crystal phase shifter according to an embodiment of the present disclosure.
Figure 2:
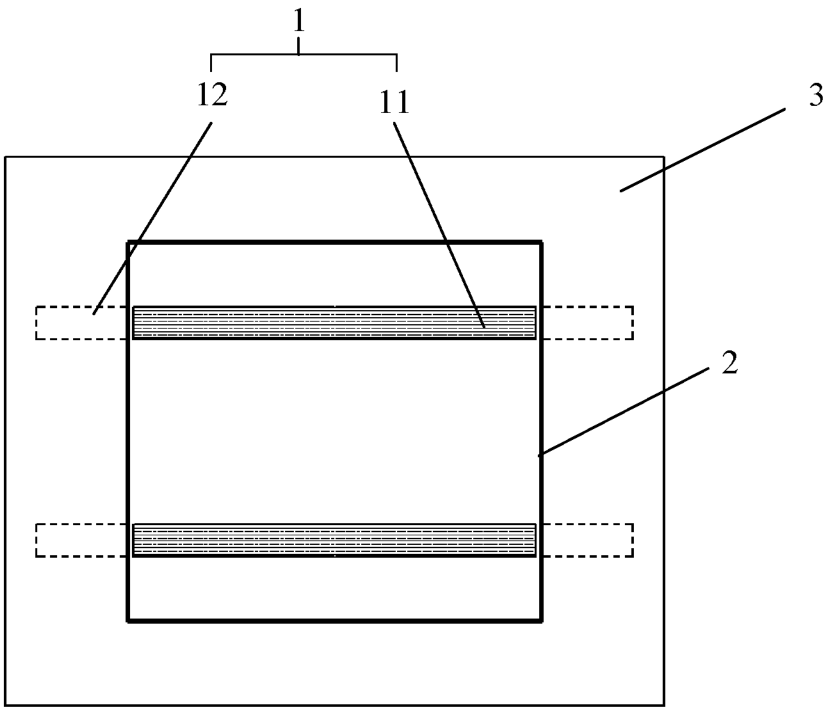
FIG. 2 shows a schematic structural diagram of a second type of the liquid-crystal phase shifter according to an embodiment of the present disclosure.

In the first aspect, an embodiment of the present disclosure provides a liquid-crystal phase shifter. FIG. 1 shows a schematic structural diagram of a first type of the liquid-crystal phase shifter according to an embodiment of the present disclosure. FIG. 2 shows a schematic structural diagram of a second type of the liquid-crystal phase shifter according to an embodiment of the present disclosure. As shown in FIGS. 1 and 2, the liquid-crystal phase shifter comprises a metal-trace layer 1, a frame sealing adhesive 2, and two separately arranged transparent substrates 3. The frame sealing adhesive 2 is disposed between the two transparent substrates 3, the frame sealing adhesive 2 encloses a first cavity, a first part 11 of the metal-trace layer 1 is located inside the first cavity, and a second part 12 of the metal-trace layer 1 is located outside the first cavity. The second part 12 is disposed on first surfaces or second surfaces of the two transparent substrates 3, wherein the first surfaces refer to the surfaces that face each other of the two transparent substrates 3, and the second surfaces refer to surfaces of the transparent substrates 3 that are opposite to the first surfaces. If the second part 12 is disposed on the first surfaces of the two transparent substrates 3, metal cushion layers 4 are provided between the frame sealing adhesive 2 and the first surfaces of the two transparent substrates 3, whereby the spacing between the two transparent substrates 3 tends to be constant. If the second part 12 is disposed on the second surfaces of the two transparent substrates 3, the first part 11 and the second part 12 are electrically connected by metal via holes provided in the transparent substrates 3, and the frame sealing adhesive 2 contacts the first surfaces of the two transparent substrates 3.

The frame sealing adhesive 2 is of a square frame structure, and the shape of the frame sealing adhesive 2 is the same as the shape of the projections of a liquid-crystal cell in the liquid-crystal phase shifter on the transparent substrates 3. The first cavity enclosed by the frame sealing adhesive 2 is the same as the cavity of the liquid-crystal cell; in other words, the first part 11 of the metal-trace layer 1 is a metal-trace part located inside the liquid-crystal cell, and the second part 12 of the metal-trace layer 1 is a metal-trace part located outside the liquid-crystal cell.

It should be noted that the frame sealing adhesive 2 located at the boundary between the first part 11 and the second part 12 of the metal-trace layer 1 squeezes the metal-trace layer 1, whereby that part of the metal-trace layer 1 is deformed, which causes that the distance between the metal-trace layers 1 provided on the two transparent substrates 3 is increased.

Based on that, in the embodiments of the present disclosure, according to the layout of the first part 11 and the second part 12 of the metal-trace layer 1, corresponding structures may be provided to ensure that the spacing between the metal-trace layers 1 provided on the two transparent substrates 3 is constant.

Figure 3:
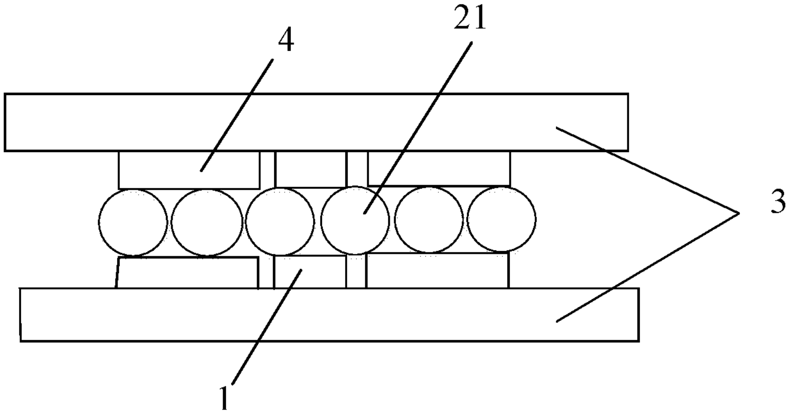
FIG. 3 shows a schematic cross-sectional structural diagram of a first type of the liquid-crystal phase shifter according to an embodiment of the present disclosure.

In an alternative implementation, the second part 12 is disposed on the first surfaces of the two transparent substrates 3; in other words, the whole of the metal-trace layer 1 is located on the two facing surfaces of the two transparent substrates 3. In the present embodiment, in order that the frame sealing adhesive 2 maintains in the same one horizontal plane at the various positions, in the embodiment of the present disclosure, as shown in FIG. 3, metal cushion layers 4 are provided between the frame sealing adhesive 2 and the first surfaces of the two transparent substrates 3; in other words, a circle of the metal cushion layers 4 are provided along the trajectory of the laying of the frame sealing adhesive 2, and the shape enclosed by the metal cushion layers 4 is the same as the shape enclosed by the frame sealing adhesive 2. Accordingly, the frame-sealing-adhesive layer 2 cannot only be supported by the metal-trace layer 1, but also be supported by the metal cushion layers 4, thereby enabling the frame sealing adhesive 2 to be maintained in the same one horizontal plane.

It should be noted that, in the present embodiment, the metal cushion layers 4 may be fabricated at the same time of fabricating the metal-trace layer 1, which cannot only sufficiently utilize the existing fabricating processes, but can also save the metal, to reduce the cost on the production and manufacturing of the metal cushion layers 4. As an example, as shown in FIGS. 11, 12, 13 and 14, the process may comprise firstly laying a seed layer 6 on the first surface of the transparent substrate 3, subsequently laying photoresist blocking walls 7 perpendicular to the seed layer on the seed layer 6, to fill the whole of the exterior of the metal-trace layer 1 and the metal cushion layer by using the photoresist blocking walls 7, subsequently electroplating the metal, and finally detaching the photoresist blocking walls 7 and the seed layer 6, to form the metal-trace layer 1 and the metal cushion layer 4.

In another alternative implementation, the second part 12 is disposed on the second surfaces of the two transparent substrates 3, the first part 11 and the second part 12 are electrically connected by metal via holes provided in the transparent substrates 3, and the frame sealing adhesive 2 contacts the first surfaces of the two transparent substrates 3. Accordingly, the frame sealing adhesive 2 located at the boundary between the first part 11 and the second part 12 of the metal-trace layer 1 directly contacts the first surfaces of the two transparent substrates 3, thereby enabling the frame sealing adhesive 2 to be maintained in the same one horizontal plane.

It should be noted that, in the present embodiment, in the wiring in the metal-trace layer 1, the metal-trace layer 1 located in the first cavity ends at the edge of the first cavity, subsequently the transparent substrates 3 are perforated, at the same time the second part 12 of the metal-trace layer 1 are fabricated on the second surfaces of the transparent substrates 3, and subsequently the holes are filled with the metal by electroplating, whereby the first part 11 and the second part 12 are communicated.

It can be seen from the above embodiments that, in the embodiments of the present disclosure, because, if the second part 12 of the metal-trace layer 1 is disposed on the first surfaces of the two transparent substrates 3, metal cushion layers 4 are provided between the frame sealing adhesive 2 and the first surfaces of the two transparent substrates 3, the frame-sealing-adhesive layer 2 cannot only be supported by the metal-trace layer 1, but also be supported by the metal cushion layers 4, whereby the spacing between the two transparent substrates 3 tends to be constant, thereby enabling the frame sealing adhesive 2 to be maintained in the same one horizontal plane. Furthermore, if the second part 12 is disposed on the second surfaces of the two transparent substrates 3, the first part 11 and the second part 12 are electrically connected by metal via holes provided in the transparent substrates 3, and the frame sealing adhesive 2 contacts the first surfaces of the two transparent substrates 3, whereby the frame sealing adhesive 2 located at the boundary between the first part 11 and the second part 12 of the metal-trace layer 1 directly contacts the first surfaces of the two transparent substrates 3, or, in other words, the frame-sealing-adhesive layer 2 does not adhere to the surface of the metal-trace layer 1, thereby enabling the frame sealing adhesive 2 to be maintained in the same one horizontal plane. In conclusion, in the liquid-crystal phase shifter according to the embodiments of the present disclosure, because it can be ensured that the frame sealing adhesive 2 is spread-coated to the same one horizontal plane, difference in the spacing between the two transparent substrates 3 caused by the provision of the metal-trace layer 1 can be prevented, which facilitates to ensure the evenness of the liquid-crystal-layer spacing, to ensure the stability of the phase-shifting amount of the liquid-crystal phase shifter.

Figure 5:
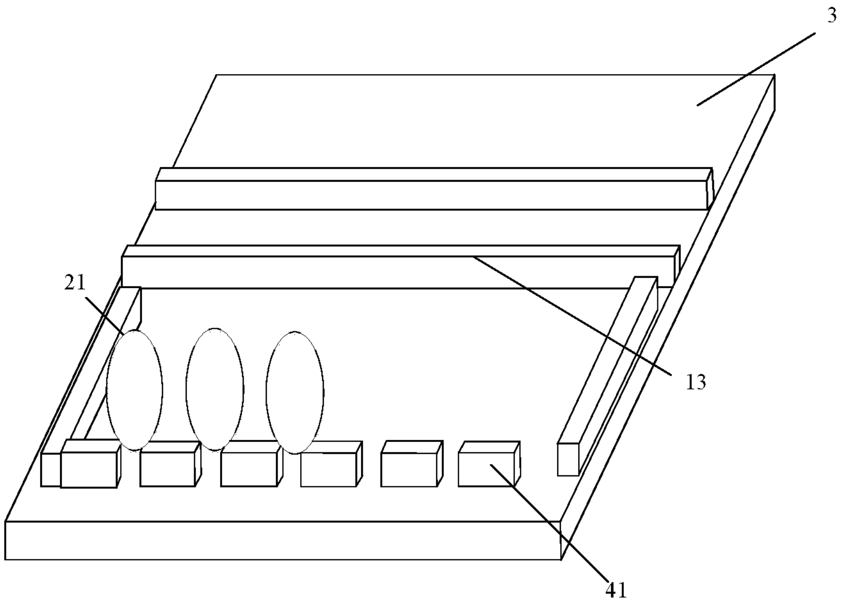
FIG. 5 shows a schematic diagram of the distribution of the silicon balls and the metal cushion blocks in the first type of the liquid-crystal phase shifter according to an embodiment of the present disclosure.

The layout, the positions, the shapes and the structures of the metal cushion layers 4 will be described particularly below by taking the case as an example in which the second part 12 are provided on the first surfaces of the two transparent substrates 3. Particularly:

In some embodiments, as shown in FIG. 5, the metal-trace layer 1 comprises at least two metal-trace strips 13 arranged parallelly. If the second part 12 is disposed on the first surfaces of the two transparent substrates 3, each of the metal cushion layers 4 provided on the two sides of the metal-trace strips 13 comprises a plurality of metal cushion blocks 41 separately arranged.

It should be noted that, if the second part 12 is disposed on the first surfaces of the two transparent substrates 3, the part of the metal cushion layer 4 that is disposed on the two sides of the two metal-trace strips 13 arranged parallelly may be parallel to the direction of extension of the metal-trace strips 13, and may also intersect with the direction of extension of the metal-trace strips 13, which is not limited in the embodiments of the present disclosure. Because that part is used to maintain the spacing between the non-operating regions of the two transparent substrates 3, in order to save the metal material, a plurality of metal cushion blocks 41 separately arranged may be provided at that part, to reduce the cost on the production and manufacturing of the metal cushion blocks 41.

Optionally, in some embodiments, the dimension of each of the metal cushion layers 4 in a first direction and the dimension of the metal-trace layer 1 in the first direction are equal, wherein the first direction refers to the direction perpendicular to the planes where the transparent substrates 3 are located. Accordingly, because the dimension of each of the metal cushion layers 4 in the first direction and the dimension of the metal-trace layer 1 in the first direction are equal, it can be ensured that the frame sealing adhesive 2 provided between the two transparent substrates 3 is located in the same one horizontal plane.

Optionally, the spacings between each two neighboring metal cushion blocks 41 are equal. Accordingly, the supporting forces of the metal cushion blocks 41 received by the frame sealing adhesive 2 can be evenly distributed, which facilitates to maintain the frame sealing adhesive 2 in the same one plane.

Figure 4:
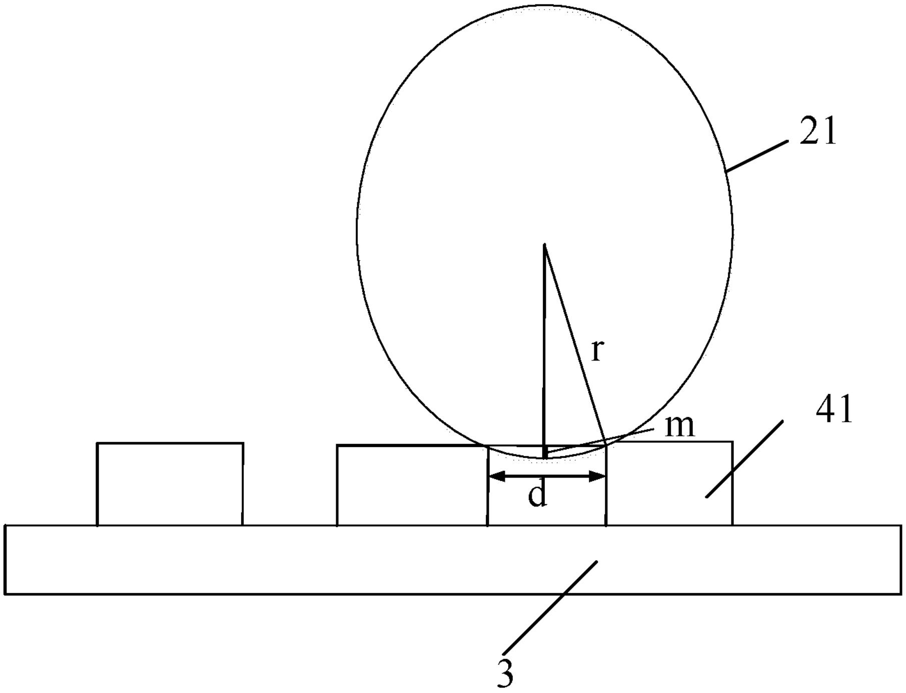
FIG. 4 shows a schematic structural diagram at the position A in FIG. 1 of a first type of the liquid-crystal phase shifter according to an embodiment of the present disclosure.

In some embodiments, as shown in FIG. 4, the frame sealing adhesive 2 comprises a plurality of silicon balls 21. One silicon ball 21 is lap-joined to two neighboring metal cushion blocks 41, and the spacing d between the two neighboring metal cushion blocks 41 is equal to 4m (2r−m) ½, wherein r is the radius of the silicon ball 21, and m is the distance between the midpoint of the connecting line between the contact points of the silicon ball 21 with the two neighboring metal cushion blocks 41 and the bottom of the silicon ball 21.

It should be noted that, as shown in the figure, the spacing d between the two neighboring metal cushion blocks 41 forms one of the right-angle sides of the right triangle shown in FIG. 4, wherein m is the distance between the midpoint of the connecting line between the contact points of the silicon ball 21 with the two neighboring metal cushion blocks 41 and the bottom of the silicon ball 21, and accordingly the length of the other right-angle side of the illustrated triangle is r−m. Accordingly, according to the Pythagorean theorem, it can be obtained that d2/4+(r−m) 2=r2, and therefore d is equal to 4m(2r−m)½. Accordingly, the spacing between the two metal cushion blocks 41 may be set according to the radius of the silicon ball 21 and the distance between the midpoint of the connecting line between the contact points of the silicon ball 21 with the two neighboring metal cushion blocks 41 and the bottom of the silicon ball 21, to ensure that the silicon ball 21 does not fall into the gap between the two metal cushion blocks 41.

Figure 6:
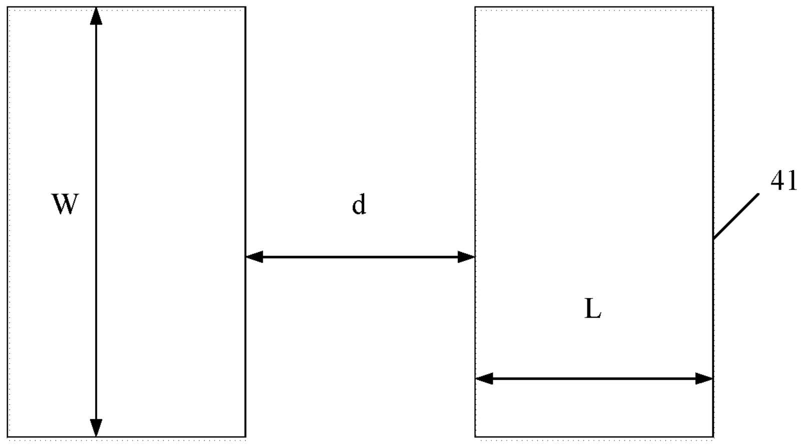
FIG. 6 shows a schematic diagram of the dimensions of metal cushion blocks according to an embodiment of the present disclosure.

Optionally, as shown in FIG. 6, the spacing d between the two neighboring metal cushion blocks 41 is greater than or equal to 0.5 micrometers, and less than or equal to 1.5 micrometers.

It should be noted that the radius of the silicon ball 21 is generally greater than or equal to 25 micrometers, and less than or equal to 30 micrometers, and therefore the spacing d between the two neighboring metal cushion blocks 41 is greater than or equal to 0.5 micrometers, and less than or equal to 1.5 micrometers, for example, 1 micrometer. Accordingly, it can be ensured that the spacing d between the two neighboring metal cushion blocks 41 is greater than or equal to 0.5 micrometers, and less than or equal to 1.5 micrometers, and that facilitates to ensure the evenness of the spacing between the two transparent substrates 3.

Optionally, as shown in FIG. 6, the dimension L of each of the metal cushion blocks 41 in a second direction is equal to 2r−d, wherein r is the radius of the silicon ball 21, and d is the spacing between two neighboring metal cushion blocks 41. The dimension W of each of the metal cushion blocks 41 in the first direction is greater than or equal to 1 millimeter, and less than or equal to 1.5 millimeters. The dimension L of each of the metal cushion blocks 41 in the second direction is greater than or equal to 23.5 micrometers, and less than or equal to 26 micrometers. The first direction refers to the direction perpendicular to the planes where the transparent substrates 3 are located, and the second direction refers to the direction perpendicular to the first direction. Accordingly, by limiting the dimension L of the metal cushion block 41 in the second direction, it can be ensured that the silicon balls 21 lap-joined to two neighboring metal cushion blocks 41 do not contact each other, to ensure that two neighboring silicon balls 21 have no interaction force therebetween, to ensure that the frame sealing adhesive 2 maintains in the same one plane. By limiting the dimension W of the metal cushion block 41 in the first direction, it can be ensured that, while the silicon balls 21 lap-joined to two neighboring metal cushion blocks 41 do not contact each other, the dimensions of the metal cushion blocks 41 in the first direction are equal, and that facilitates to ensure the evenness of the spacing between the two transparent substrates 3.

Figure 7:
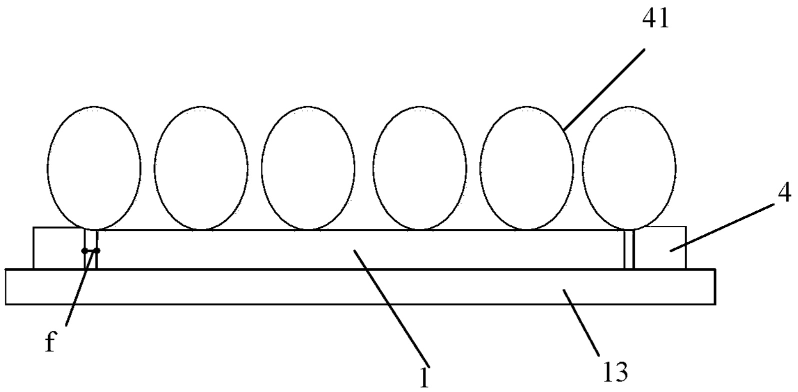
FIG. 7 shows a schematic structural diagram at the position B in FIG. 1 of a first type of the liquid-crystal phase shifter according to an embodiment of the present disclosure.

In some embodiments, as shown in FIG. 7, the distances f from one metal cushion block 41 that is disposed between the two metal-trace strips 13 arranged parallelly to the metal-trace strips 13 are greater than or equal to 0.9 micrometers, and less than or equal to 1.1 micrometers. Accordingly, the metal cushion blocks 41 and the metal-trace strips 13 are separately arranged, to prevent the metal cushion blocks 41 from influencing the metal-trace strips 13.

Figure 8:
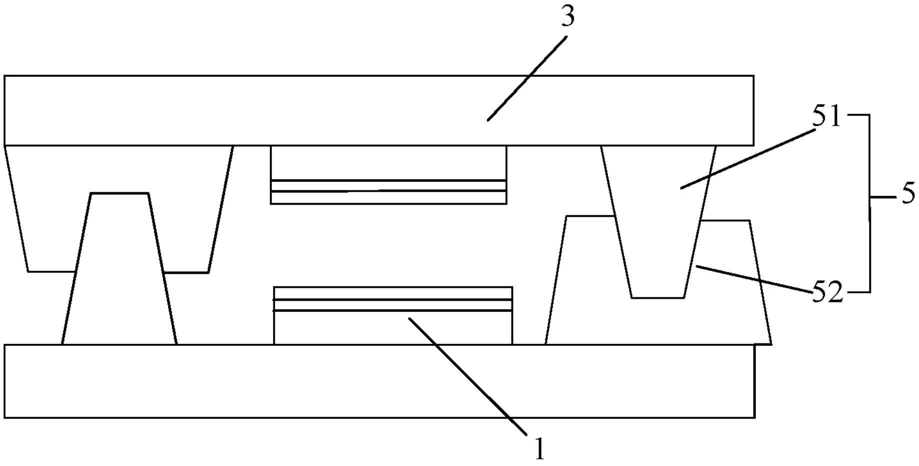
FIG. 8 shows a schematic diagram of the assembling of supporting assemblies according to an embodiment of the present disclosure.
Figure 9:
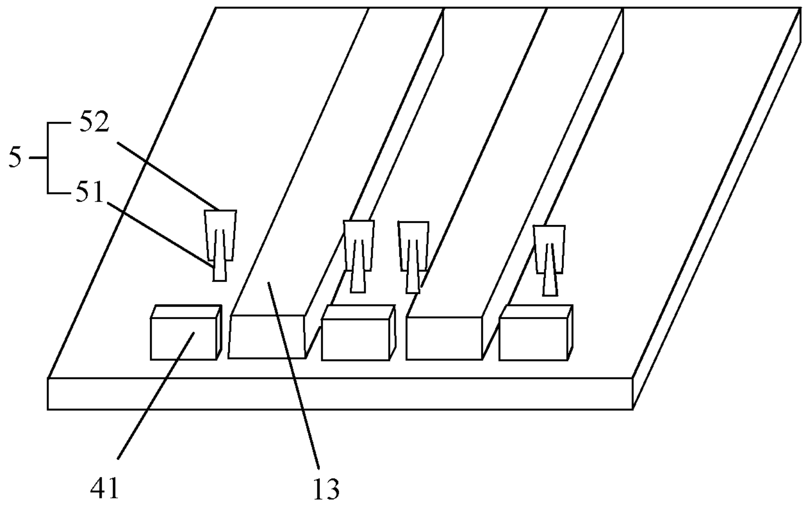
FIG. 9 shows a schematic diagram of installation positions of supporting assemblies according to an embodiment of the present disclosure.
Figure 10:
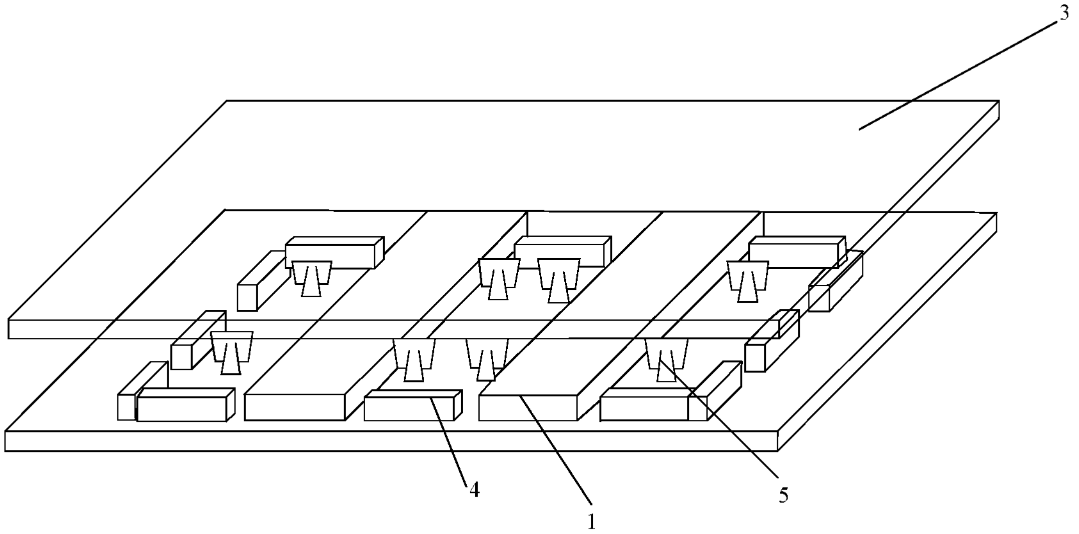
FIG. 10 shows a schematic diagram of distribution positions of supporting assemblies according to an embodiment of the present disclosure.
Figure 11:
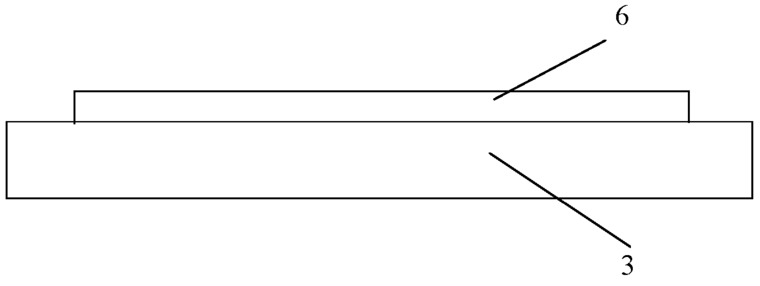
FIG. 11 shows a first step of the fabricating process of the metal cushion blocks according to an embodiment of the present disclosure.
Figure 12:
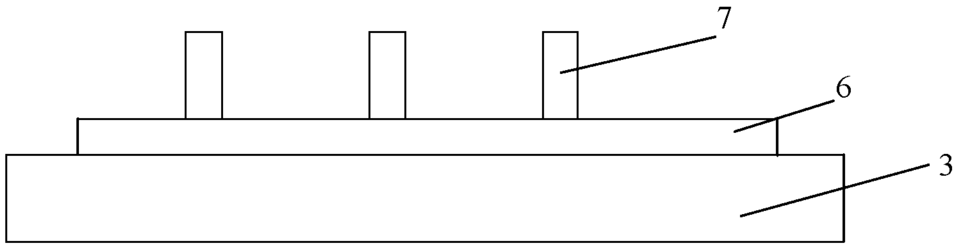
FIG. 12 shows a second step of the fabricating process of the metal cushion blocks according to an embodiment of the present disclosure.
Figure 13:
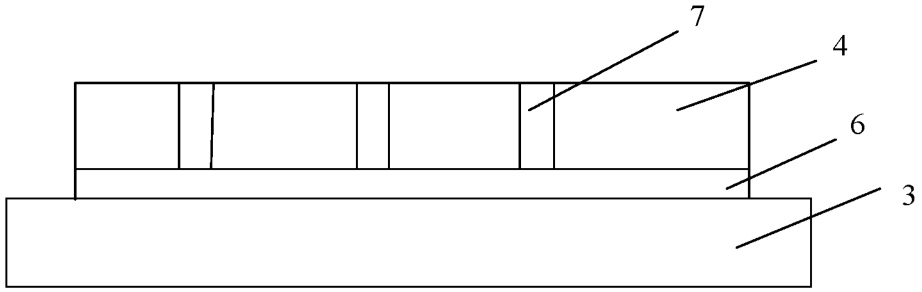
FIG. 13 shows a third step of the fabricating process of the metal cushion blocks according to an embodiment of the present disclosure.
Figure 14:
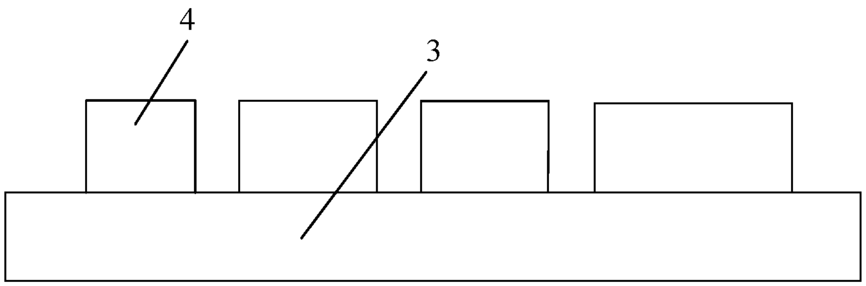
FIG. 14 shows a fourth step of the fabricating process of the metal cushion blocks according to an embodiment of the present disclosure.

Besides the above, in the first cavity enclosed by the frame sealing adhesive 2, it is further required to add additional supporting forces to ensure that the spacing between the two transparent substrates 3 maintain constant. Particularly:

In some embodiments, as shown in FIGS. 8, 9 and 10, supporting assemblies 5 are provided between the transparent substrates 3 located inside the first cavity, and one supporting assembly 5 that is disposed on one of the two transparent substrates 3 is cooperatively connected to one supporting assembly 5 that is disposed on the other of the transparent substrates 3.

It should be noted that the supporting assemblies 5 may be metal snap-fitting members 51, and may also be non-metal snap-fitting members 51, which is not limited in the embodiments of the present disclosure. Each of the facing first surfaces of the two transparent substrates 3 is provided with a supporting assembly 5, and all of the supporting assemblies 5 provided on one of the transparent substrates 3 correspond to the supporting assemblies 5 provided on the other of the transparent substrates 3. Accordingly, the supporting assemblies 5 provided on one of the two transparent substrates 3 are cooperatively connected to the supporting assemblies 5 provided on the other of the transparent substrates 3, whereby the supporting assemblies 5 can be used to provide supporting forces between the two transparent substrates 3, thereby ensuring the evenness of the spacing between the two transparent substrates 3.

Optionally, the supporting assemblies 5 comprise at least two snap-fitting members 51 and at least two biting members 52. One snap-fitting member 51 that is disposed on one of the two transparent substrates 3 is snap-fitted to one biting member 52 that is disposed on the other of the transparent substrates 3. One biting member 52 that is disposed on one of the two transparent substrates 3 is snap-fitted to one snap-fitting member 51 that is disposed on the other of the transparent substrates 3.

It should be noted that the snap-fitting member 51 may be of a block structure whose cross section in the first direction is any one of the shapes of a square, a triangle, a trapezoid and so on. The biting member 52 is provided with a slot whose structure is the same as the end of the snap-fitting member 51 that faces the biting member 52. Accordingly, by configuring that one snap-fitting member 51 that is disposed on one of the two transparent substrates 3 is snap-fitted to one biting member 52 that is disposed on the other of the transparent substrates 3, and one biting member 52 that is disposed on one of the two transparent substrates 3 is snap-fitted to one snap-fitting member 51 that is disposed on the other of the transparent substrates 3, the two transparent substrates 3 can be supported by the snap-fitting structure formed by the snap-fitting members 51 and the biting members 52. It should also be noted that, because both of the two transparent substrates 3 are provided with the snap-fitting members 51 and the biting members 52, the forces of the snap-fitting members 51 and the supporting members received by the two transparent substrates 3 are the same, which facilitates to ensure the evenness of the spacing between the two transparent substrates 3. In addition, the quantity of the snap-fitting members 51 and the quantity of the biting members 52 that are provided on the same one transparent substrate 3 may be equal, and may also be unequal, which is not limited in the embodiments of the present disclosure.

In some embodiments, the quantity of the snap-fitting members 51 and the quantity of the biting members 52 that are provided on the same one transparent substrate 3 are equal. That can maintain that the time quantity of the snap fitting by the snap-fitting members 51 and the time quantity of the biting by the biting members 52 provided on the same one transparent substrate 3 are equal, which does not only facilitate the assembling, but also facilitates to maintain the structural stability between the two transparent substrates 3. In addition, it should also be noted that, in order to further enhance the structural stability between the two transparent substrates 3, the snap-fitting members 51 and the biting members 52 on the same one transparent substrate 3 may be arranged in stagger; in other words, one biting member 52 is disposed between two neighboring snap-fitting members 51. Accordingly, the connection between the snap-fitting members 51 and the biting members 52 between the two transparent substrates 3 are firmer, which further facilitates to maintain the evenness of the spacing between the two transparent substrates 3.

Optionally, the cross section of each of the snap-fitting members 51 in the second direction is trapezoidal, and the cross section of each of the biting members 52 in the second direction has a trapezoidal slot, wherein the second direction refers to the direction perpendicular to the planes where the transparent substrates 3 are located.

It should be noted that, because the trapezoid has two inclined sides, or, in other words, the snap-fitting member 51 has at least two inclined faces that contact the inclined faces of the biting member 52, accordingly, the snap-fitting member 51 and the biting member have at least two mutually limiting faces after the snap fitting, so that the connection between the snap-fitting member 51 and the biting member 52 is firmer.

Optionally, the cross section of each of the snap-fitting members 51 in the second direction is an isosceles-trapezoidal cross section. The cross section of each of the biting members 52 in the second direction has an isosceles-trapezoidal slot.

Particularly, the distance between the two bottom sides of the isosceles-trapezoidal slot is equal to one third of the dimension of the biting member 52 in the first direction, the height between the two bottom sides of the isosceles-trapezoidal cross section may be equal to two thirds of the distance between the two transparent substrates 3, and the ratio of the lengths of the two bottom sides is greater than or equal to 1, and less than or equal to 1.5, wherein the ratio refers to the ratio of the longer bottom side to the shorter bottom side. Accordingly, the snap fitting between the snap-fitting member 51 whose cross section is the isosceles trapezoid and the biting member 52 that has the isosceles-trapezoidal slot is firmer, which facilitates to further increase the firmness of the connection between the snap-fitting member 51 and the biting member 52.

Optionally, the dimension of the isosceles-trapezoidal cross section in the first direction is two thirds of the distance between the two transparent substrates 3. Accordingly, it can be ensured that the snap-fitting member 51 and the biting member 52 have a sufficient snap-fitting depth therebetween, to further increase the firmness of the connection between the snap-fitting member 51 and the biting member 52.

It can be seen from the above embodiments that, in the embodiments of the present disclosure, because, if the second part 12 of the metal-trace layer 1 is disposed on the first surfaces of the two transparent substrates 3, metal cushion layers 4 are provided between the frame sealing adhesive 2 and the first surfaces of the two transparent substrates 3, the frame-sealing-adhesive layer 2 cannot only be supported by the metal-trace layer 1, but also be supported by the metal cushion layers 4, whereby the spacing between the two transparent substrates 3 tends to be constant, thereby enabling the frame sealing adhesive 2 to be maintained in the same one horizontal plane. Furthermore, if the second part 12 is disposed on the second surfaces of the two transparent substrates 3, the first part 11 and the second part 12 are electrically connected by metal via holes provided in the transparent substrates 3, and the frame sealing adhesive 2 contacts the first surfaces of the two transparent substrates 3, whereby the frame sealing adhesive 2 located at the boundary between the first part 11 and the second part 12 of the metal-trace layer 1 directly contacts the first surfaces of the two transparent substrates 3, or, in other words, the frame-sealing-adhesive layer 2 does not adhere to the surface of the metal-trace layer 1, thereby enabling the frame sealing adhesive 2 to be maintained in the same one horizontal plane. In conclusion, in the liquid-crystal phase shifter according to the embodiments of the present disclosure, because it can be ensured that the frame sealing adhesive 2 is spread-coated to the same one horizontal plane, difference in the spacing between the two transparent substrates 3 caused by the provision of the metal-trace layer 1 can be prevented, which facilitates to ensure the evenness of the liquid-crystal-layer spacing, to ensure the stability of the phase-shifting amount of the liquid-crystal phase shifter.

In the second aspect, an embodiment of the present disclosure provides an antenna device, wherein the antenna device comprises the liquid-crystal phase shifter according to any one of the embodiments in the first aspect. The advantageous effects of the antenna device are the same as the advantageous effects of the liquid-crystal phase shifter stated above, and are not discussed further in the embodiments of the present disclosure.

It should be noted that the embodiments of the description are described in the mode of progression, each of the embodiments emphatically describes the differences from the other embodiments, and the same or similar parts of the embodiments may refer to each other.

Although alternative embodiments of the embodiments of the present disclosure have been described, once a person skilled in the art has known the essential inventive concept, he may make further variations and modifications on those embodiments. Therefore, the appended claims are intended to be interpreted as including the alternative embodiments and all of the variations and modifications that fall within the scope of the embodiments of the present disclosure.

Finally, it should also be noted that, herein, relation terms such as first and second are merely intended to distinguish one entity from another entity, and that does not necessarily require or imply that those entities have therebetween any such actual relation or order. Furthermore, the terms “include”, “comprise” or any variants thereof are intended to cover non-exclusive inclusions, so that articles or terminal devices that include a series of elements do not only include those elements, but also include other elements that are not explicitly listed, or include the elements that are inherent to such articles or terminal devices. Unless further limitation is set forth, an element defined by the wording “comprising a . . . ” does not exclude additional same element in the article or terminal device comprising the element.

The technical solutions of the present disclosure have been described in detail above. The principle and the embodiments of the present disclosure are described herein with reference to the particular examples. Moreover, for a person skilled in the art, according to the principle and the implementations of the present disclosure, the particular embodiments and the range of application may be varied. In conclusion, the contents of the description should not be understood as limiting the present disclosure.

The invention claimed is:

1. A liquid-crystal phase shifter comprising a metal-trace layer, a frame sealing adhesive, and two separately arranged transparent substrates, wherein:

the frame sealing adhesive is disposed between the two transparent substrates, the frame sealing adhesive encloses a first cavity, a first part of the metal-trace layer is located inside the first cavity, and a second part of the metal-trace layer is located outside the first cavity;

the second part is disposed on first surfaces of the two transparent substrates, wherein the first surfaces refer to surfaces that face each other of the two transparent substrates;

metal cushion layers are provided between the frame sealing adhesive and the first surfaces of the two transparent substrates, with a spacing between the two transparent substrates being maintained constant; and the metal cushion layers are provided along a laying trajectory of the frame sealing adhesive, and a shape enclosed by the metal cushion layers is the same as a shape enclosed by the frame sealing adhesive.

2. The liquid-crystal phase shifter according to claim 1, wherein the metal-trace layer comprises at least two metal-trace strips arranged parallelly; and each of the metal cushion layers provided on two sides of the metal-trace strips comprises a plurality of metal cushion blocks separately arranged.

3. The liquid-crystal phase shifter according to claim 1, wherein a dimension of each of the metal cushion layers in a first direction and a dimension of the metal-trace layer in the first direction are equal, wherein the first direction refers to a direction perpendicular to planes where the transparent substrates are located.

4. The liquid-crystal phase shifter according to claim 2, wherein the frame sealing adhesive comprises a plurality of silicon balls; and one instance of the silicon balls is lap-joined to two neighboring instances of the metal cushion blocks, and a spacing d between the two neighboring instances of the metal cushion blocks is equal to $4m(2r-m)^{1/2}$, wherein r is a radius of the silicon ball, and m is a distance between a midpoint of a connecting line between contact points of the silicon ball with the two neighboring instances of the metal cushion blocks and a bottom of the silicon ball.

5. The liquid-crystal phase shifter according to claim 4, wherein the spacing d between the two neighboring instances of the metal cushion blocks is greater than or equal to 0.5 micrometers, and less than or equal to 1.5 micrometers.

6. The liquid-crystal phase shifter according to claim 4, wherein a dimension L of each of the metal cushion blocks in a second direction is equal to 2r−d, wherein d is a spacing between two neighboring instances of the metal cushion blocks;

a dimension W of each of the metal cushion blocks in a first direction is greater than or equal to 1 millimeter, and less than or equal to 1.2 millimeters; and a dimension L of each of the metal cushion blocks in the second direction is greater than or equal to 23.5 micrometers, and less than or equal to 26 micrometers, wherein the first direction refers to a direction perpendicular to planes where the transparent substrates are located, and the second direction refers to a direction perpendicular to the first direction.

7. The liquid-crystal phase shifter according to claim 2, wherein distances from one instance of the metal cushion blocks that is disposed between the two metal-trace strips arranged parallelly to the metal-trace strips are greater than or equal to 0.9 micrometers, and less than or equal to 1.1 micrometers.

8. The liquid-crystal phase shifter according to claim 1, wherein supporting assemblies are provided between the transparent substrates located inside the first cavity, and one instance of the supporting assemblies that is disposed on one of the two transparent substrates is cooperatively connected to one instance of the supporting assemblies that is disposed on the other of the transparent substrates.

9. The liquid-crystal phase shifter according to claim 8, wherein the supporting assemblies comprise at least two snap-fitting members and at least two biting members;

one instance of the snap-fitting members that is disposed on one of the two transparent substrates is snap-fitted to one instance of the biting members that is disposed on the other of the transparent substrates; and one instance of the biting members that is disposed on one of the two transparent substrates is snap-fitted to one instance of the snap-fitting members that is disposed on the other of the transparent substrates.

10. The liquid-crystal phase shifter according to claim 9, wherein a cross section of each of the snap-fitting members in a second direction is trapezoidal, and a cross section of each of the biting members in the second direction has a trapezoidal slot, wherein the second direction refers to a direction perpendicular to planes where the transparent substrates are located.

11. The liquid-crystal phase shifter according to claim 10, wherein the cross section of each of the snap-fitting members in the second direction is an isosceles-trapezoidal cross section;

the cross section of each of the biting members in the second direction has an isosceles-trapezoidal slot; and a dimension of the isosceles-trapezoidal cross section in a first direction is two thirds of a distance between the two transparent substrates.

12. An antenna device, wherein the antenna device comprises the liquid-crystal phase shifter according to claim 1.

13. The antenna device according to claim 12, wherein the metal-trace layer comprises at least two metal-trace strips arranged parallelly; and each of the metal cushion layers provided on two sides of the metal-trace strips comprises a plurality of metal cushion blocks separately arranged.

14. The antenna device according to claim 12, wherein a dimension of each of the metal cushion layers in a first direction and a dimension of the metal-trace layer in the first direction are equal, wherein the first direction refers to a direction perpendicular to planes where the transparent substrates are located.

15. The antenna device according to claim 13, wherein the frame sealing adhesive comprises a plurality of silicon balls; and one instance of the silicon balls is lap-joined to two neighboring instances of the metal cushion blocks, and a spacing d between the two neighboring instances of the metal cushion blocks is equal to $4m(2r-m)^{1/2}$, wherein r is a radius of the silicon ball, and m is a distance between a midpoint of a connecting line between contact points of the silicon ball with the two neighboring instances of the metal cushion blocks and a bottom of the silicon ball.

16. The antenna device according to claim 15, wherein the spacing d between the two neighboring instances of the metal cushion blocks is greater than or equal to 0.5 micrometers, and less than or equal to 1.5 micrometers.

17. The antenna device according to claim 15, wherein a dimension L of each of the metal cushion blocks in a second direction is equal to 2r−d, wherein d is a spacing between two neighboring instances of the metal cushion blocks;

a dimension W of each of the metal cushion blocks in a first direction is greater than or equal to 1 millimeter, and less than or equal to 1.2 millimeters; and a dimension L of each of the metal cushion blocks in the second direction is greater than or equal to 23.5 micrometers, and less than or equal to 26 micrometers, wherein the first direction refers to a direction perpendicular to planes where the transparent substrates are located, and the second direction refers to a direction perpendicular to the first direction.

18. The antenna device according to claim 13, wherein distances from one instance of the metal cushion blocks that is disposed between the two metal-trace strips arranged parallelly to the metal-trace strips are greater than or equal to 0.9 micrometers, and less than or equal to 1.1 micrometers.

19. The antenna device according to claim 12, wherein supporting assemblies are provided between the transparent substrates located inside the first cavity, and one instance of the supporting assemblies that is disposed on one of the two transparent substrates is cooperatively connected to one instance of the supporting assemblies that is disposed on the other of the transparent substrates.

20. A liquid-crystal phase shifter comprising a metal-trace layer, a frame sealing adhesive, and two separately arranged transparent substrates, wherein:

the frame sealing adhesive is disposed between the two transparent substrates, the frame sealing adhesive encloses a first cavity, a first part of the metal-trace layer is located inside the first cavity, and a second part of the metal-trace layer is located outside the first cavity; and the second part is disposed on second surfaces of the two transparent substrates, the first part and the second part are electrically connected by metal via holes provided in the transparent substrates, and the frame sealing adhesive contacts first surfaces of the two transparent substrates, wherein the first surfaces refer to surfaces that face each other of the two transparent substrates, and the second surfaces refer to surfaces of the transparent substrates that are opposite to the first surfaces.

* * * * *